United States Patent Office 2,719,090
Patented Sept. 27, 1955

2,719,090

HEAT FUGITIVE YELLOW COATING COMPOSITION AND PROCESS OF MAKING IT AND A FILM FORMED OF IT

Beachley Alfred Morehead, Springfield, Pa., assignor to E. I. du Pont de Nemours and Company, Wilmington, Del., a corporation of Delaware No Drawing. Application December 14, 1951,
Serial No. 261,753

9 Claims. (Cl. 106—193)

This invention relates to films and coatings. More particularly it relates to improvements in organic films or coatings which tend to develop an undesirable yellowish discoloration when they are subjected to heat. Still more particularly it relates to organic films or coatings which are free of this objectionable yellowish discoloration and to the film forming composition from which said films or coatings are prepared.

In the commercial application of film forming coating compositions it is common practice to apply a relatively thin coat of the composition to the surface of an article and then to heat or bake the coating at an elevated temperature to cure, polymerize or otherwise dry the coating and thus produce a useful article.

In the case of white coating compositions, an objectionable yellowish discoloration frequently develops in the coating during the heating or baking step. The resulting coated article is then less salable or less satisfying to the ultimate consumer than a similar one having no yellowish discoloration.

The yellowish heat discoloration develops even more frequently, or to a more objectionable degree, when the film is subjected to more heat than that required to dry or cure the film to an acceptable state of dryness or hardness, a condition which is sometimes referred to as "overbaking." Some of the causes of overbaking are poor temperature control in the baking ovens, which results in "hot spots" (zones of excessively high temperature), mechanical failure, and equipment slowdowns or shutdowns which result in leaving the article in a hot oven longer than normal. In commercial operations, the effect of overbaking is that the color of the overbaked articles does not match the color of those that are properly baked. This non-uniformity of color is most objectionable when the articles, which are separate elements to be assembled later into a composite article, do not match. For instance, the doors, drawers and body of a white enameled steel kitchen cabinet are often coated with the same baking-type coating composition on separate conveyor lines and are subsequently assembled. If the separate elements are not all the same shade of white, an inferior and possibly unsalable cabinet is produced.

A further example of yellowish heat discoloration is that which occurs when a film or coating is subjected to heat when in service, for instance in areas near the heating element of a kitchen stove.

The development of yellowish heat discoloration is therefore a problem from three different standpoints; namely (1) the objectionable inherent yellowing of certain compositions during baking even though the amount of heat is proper and not excessive, (2) the objectionable yellowing of certain other compositions which do not yellow when properly baked but which do yellow when overbaked, and (3) the objectionable yellowing which develops when certain compositions are overheated in service.

Yellowish heat discoloration is believed to result principally from the effect of heat on the organic film forming materials used in film forming compositions. However, in the case of some pigmented compositions, the yellowing is believed to be increased by the presence of certain pigments.

The principal object of this invention is the provision of yellowish organic films and coatings which do not change color on heating.

These objects are accomplished by incorporating heat-fugitive yellow coloring matter in film forming compositions which develop objectionable yellowish heat discoloration, in such concentration that the inherent increase in yellowness of the normal constituents of the composition during heating is offset by a substantially equal decrease in yellowness resulting from extinction of the yellow effect of the added heat-fugitive yellow coloring matter.

In the preferred embodiment of this invention, these objects are accomplished by incorporating heat-fugitive yellow coloring matter with the other coloring materials in the film forming compositions which are normally employed to pigment and/or color the composition. Since most colored films, including whites, have a yellow portion in their color spectrum, this preferred embodiment is most easily accomplished by substituting the heat-fugitive yellow coloring matter for all or part of a substance in the film forming composition which supplies a yellow component to the composite color of an unbaked film of the film forming composition. The amount of heat-fugitive yellow coloring matter should be such that the inherent increase in yellowness of the normal constituents of the film during baking is offset by a substantially equal decrease in yellowness resulting from extinction of the yellow effect of the added heat-fugitive coloring matter. Thus the intensity of the yellow component in the composite color does not change materially from the unbaked film to the baked film.

It will be recognized, in a complete understanding of this invention, that the degree of yellowness, as referred to, may be so slight that it is distinguishable to the human eye only when a less yellow film is used as a standard for direct comparison. For example, an enameled refrigerator cabinet may appear to be white when viewed alone but yellowish-white when compared directly with a more nearly "perfect" white such as magnesium oxide.

This invention is not directed toward eliminating any desirable yellow component from the composite color of the film but, to the contrary, is directed principally toward the prevention of an undesirable increase in yellowness of colored and white films which results from heat.

The terms "overbaking," and "overheating" as used herein, mean exposure of a film or coating to more heat than is required to dry or cure the film to an acceptable state of dryness or hardness. More heat than is necessary may result from too high a temperature or too long a time at the normal temperature.

The term "heat-fugitive," as used herein with respect to yellow coloring matter, means unstable, volatile, evanescent, labile, decomposable, or reactive under the influence of heat in the presence of the other constituents of the film in such a manner that the yellowness of the coloring matter disappears or is materially lessened.

The term "organic film forming material," as used herein, means organic materials capable of forming deposits which dry or harden to produce tough, durable, water resistant films by evaporation, oxidation, fusion, polymerization, or combinations thereof. This drying or hardening may be spontaneous or may be promoted by heat and/or catalyst. Examples of such organic film forming materials include vegetable drying and semi-drying oils, alkyd resins, amino aldehyde resins, vinyl resins, and acrylic resins.

The term "film" as used herein, means a tough, durable, water resistant adherent coating on a substrate or an unsupported film of plastic material.

The following specific examples illustrate the preferred embodiment of the invention, but the scope of the invention is not intended to be limited thereby. Throughout the specifications and appended claims the parts and percentage figures are expressed on a weight basis.

*Example 1*

An enamel was made by ball milling the following ingredients until a stable uniform dispersion was obtained:

| | Parts |
|---|---|
| Titanium dioxide pigment | 26.0 |
| Butylated urea formaldehyde resin; 60% solution in butanol | 15.7 |
| Soya oil modified alkyd resin; 55% solution in hydrocarbon solvents | 1.4 |
| Dehydrated castor oil modified alkyd resin; 54% solution in hydrocarbon solvents | 45.7 |
| Hydrocarbon solvents | 9.0 |
| Butanol | 2.2 |
| | 100.0 |

In the above formula the butanol and hydrocarbon solvents represent the volatile portion and the remaining ingredients represent the nonvolatile portion.

The resulting product was divided into two equal portions "A" and "B."

The portion, "A," was adjusted in color to match an acceptable white standard by adding and intimately intermixing traces of finely divided carbon black, ultramarine blue, ferrite yellow and violet pigments which previously had been separately dispersed in an alkyd resin solution to form shading pastes. All of these pigments are commonly used in the prior art methods of shading white pigmented enamels to match the standard color.

The portion, "B," was shaded to match both the standard color and the shaded portion "A" using the method of this invention. Traces of ultramarine blue and violet pigments dispersed in an alkyd resin solution were added to portion "B" along with about 0.005% by weight of 4-aminoazobenzene coupled with phenol ("Acetamine" Yellow 4RL dye), based on the weight of the non-volatile components of portion "B." The "Acetamine" Yellow 4RL dye was in solution in methyl ethyl ketone. The carbon black and ferrite yellow used in portion "A" were not necessary to match the standard color when using the "Acetamine" Yellow 4RL dye.

Both shaded portions, "A" and "B," were thinned for application and were sprayed on primed steel panels. Two panels were prepared with each shaded portion and were designated panels "A" and "B" respectively. Two "A" panels and two "B" panels were placed in an oven in which the air temperature was 280° F. At the end of 30 minutes, which was sufficient to cure the coating to an acceptable state of dryness and hardness, one panel "A" and one panel "B" were removed from the oven and cooled to room temperature. At the end of an additional 30 minutes (total exposure 60 minutes) the remaining two panels "A" and "B" were removed. All four heated panels were compared with the original standard white. The colors of the panels "A" and "B" with the 30 minute exposure still substantially matched each other and the standard white. However, the second set (60 minutes exposure) showed that the panel "A" which had been shaded by the prior art method had developed a noticeable yellowish heat discoloration whereas the panel "B," which contained heat-fugitive yellow coloring matter in accordance with this invention, had not discolored objectionably and had remained substantially the same color as the standard white.

These results showed that prior art white enamels, as exemplified by panel "A," are susceptible to yellowish heat discoloration when baked at a given temperature for a longer period of time than that required for acceptable curing, whereas the white enamels of this invention do not discolor objectionably under the same conditions.

*Example 2*

Example 1 was repeated in substance except that panels "A" and "B" were baked for 30 minutes at a higher temperature, 325° F. This baking schedule produced yellowish heat discoloration in panel "A," but not in panel "B."

This result showed that the prior art enamel is susceptible to yellowish heat discoloration when baked at a higher temperature than that required for accepetable curing, whereas the enamel of this invention does not discolor objectionably under the same conditions.

Similar experiments showed that 4-aminoazobenzene coupled with phenol ("Acetamine" Yellow 4RL dye) 4-dimethylaminoazobenzene, meta-nitro para-toluidine coupled with acetoacetanilide, 4-aminoazobenzene, aniline coupled with phenol, aniline meta sulfonic acid, tetrachlorohydroquinone, diterpene diphenol, and beta naphthylamine, when used within the range set forth hereinafter, inhibit or prevent the formation of yellowish heat discoloration in compositions containing alkyd resin modified with vegetable oil or vegetable oil acid, urea formaldehyde resin, melamine formaldehyde resin or other organic film forming materials commonly used in preparing films and coatings.

These yellow coloring materials are all characterized by fading from the film (i. e. losing yellowness) to the desired extent when used in the proper concentration and when exposed to heat encountered during manufacture or service. It will be obvious to those skilled in the art that other heat fugitive yellows not mentioned above may also be employed within the spirit and scope of this invention.

For reasons of economy, availability, ease of handling, or other desirable properties, the preferred heat sensitive yellow coloring materials are 4-aminoazobenzene coupled with phenol, 4-dimethylaminoazobenzene, meta-nitro para-toluidine coupled with acetoacetanilide, 4-aminoazobenzene, and aniline coupled with phenol.

The heat-fugitive yellow coloring matter may be incorporated in the film forming composition as a solution in a convenient solvent such as methyl ethyl ketone, methyl isobutyl ketone, or ethylene glycol monobutyl ether; as a dispersion in a convenient non-solvent, as a solution or dispersion in a liquid component of the composition (e. g. a solution of film forming material), or as a component of that portion of a film forming composition which is normally milled or ground. It is obvious that the heat-fugitive yellow coloring matter must be compatible with and innocuous to the other constituents of the composition in which it is used. The amount of heat-fugitive yellow coloring matter to be added may vary over a wide range depending upon: (1) the degree to which the unmodified film yellows upon heating, (2) the original yellowness of the added heat-fugitive material, and (3) the amount of yellowness lost by the heat-fugitive material when heated under the time and temperature conditions to which the film is expected to be exposed during manufacture or service. The preferred concentration of heat-fugitive yellow coloring matter is of the order of 0.001%–2.0% by weight based on the non-volatile portion of the film forming composition.

Although the film forming material used in the examples was a blend of alkyd and urea formaldehyde resins, the invention embraces other film forming materials which, when used alone, blended with one another, or pigmented, are affected by yellowish heat discoloration, such as, e. g.:

Alkyd resins (polyhydric alcohol-polybasic acid condensates) modified with such vegetable oils or oil acids as linseed, China wood, soya bean, dehydrated castor, castor, cocoanut, perilla, oiticica, or mixtures thereof.
Monohydric alcohol modified amino aldehyde resins such as urea formaldehyde and melamine formaldehyde.
Oleoresinous varnishes comprising natural or synthetic resins and oils.
Drying or semi-drying vegetable oils and modifications thereof, such as styrenated oils.
Synthetic drying oils, such as polybutadiene.
Polyamine resins such as hexamethylene adipamide polymers.
Polyester resins such as ethylene glycol phthalate polymers.
Polyepoxide resins such as epichlorhydrin-diphenylol propane polymers.
Phenol formaldehyde resins.
Vinyl and vinylidene ester and halide resins.
Acrylate and methacrylate ester resins.
Cellulose derivatives comprising nitrocellulose, cellulose acetate, cellulose acetopropionate and cellulose acetobutyrate.

The examples illustrate the principle of this invention in a film forming composition containing white titanium dioxide as the principal pigment. Although yellowish heat discoloration is usually more noticeable, and therefore more objectionable, in pigmented whites and pale tints; the invention is not limited to such colors, or to pigmented products. The film may be any color which upon heating develops a yellowish heat discoloration. The nature and proportions of a pigment, when used, may vary within the usual broad limits known in the film and coating composition arts. Useful pigments other than those disclosed in the examples include:

Other white pigments such as, e. g. zinc oxide.
Colored metal oxide, hydroxide, and chromate pigments.
Silicate extender pigments.
Iron blue pigments.
Organic dyestuffs and lakes thereof.

The baking schedules employed in the examples illustrate commercially practical schedules for baking-type enamels. However, it is well-known that different films require different amounts of drying, polymerization, or oxidation. Baking schedules for different types of films range from several hours at a low temperature like 150° F. to fractions of a minute at high temperatures like 750° F. Such a range for commercial coating and film producing processes is within the scope of this invention, the particular combination of time and temperature being selected so as to produce the desired degree of drying or hardness.

This invention is useful in preventing yellowish heat discoloration in films or compositions which are subjected to heat, such as paints, enamels, lacquers, fabric coatings and unsupported films. Heating may be a required step in the preparation of a useful coating or film or it may result from a condition to which the film is exposed during service.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

I claim:
1. A substantially white organic coating composition which contains a component subject to yellowish heat discoloration, said composition comprising pigment, organic film-forming material, and a compatible heat-fugitive yellow coloring matter selected from the group consisting of 4-aminoazobenzene coupled with phenol, 4-dimethyl aminoazobenzene, meta-nitro para-toluidene coupled with acetoacetanilide, 4-aminoazobenzene, and aniline coupled with phenol, the increased yellowness which develops in said component subject to yellowish heat discoloration being offset by a substantially equal loss of yellowness in said heat-fugitive yellow coloring matter when said composition is heated.

2. The product of claim 1 in which the heat-fugitive yellow coloring matter is present in an amount between about .001% and 2.0% based on the weight of the film-forming composition.

3. The product of claim 1 in which the heat-fugitive yellow is 4-aminoazobenzene coupled with phenol.

4. The product of claim 1 in which the heat-fugitive yellow is 4-dimethylaminoazobenzene.

5. The product of claim 1 in which the heat-fugitive yellow is meta-nitro para-toluidene coupled with acetoacetanilide.

6. The product of claim 1 in which the heat-fugitive yellow is 4-aminoazobenzene.

7. The product of claim 1 in which the heat-fugitive yellow is aniline coupled with phenol.

8. A substantially white film which contains a component subject to yellowish heat discoloration, said composition comprising pigment, organic film-forming material, and a compatible heat-fugitive yellow coloring matter selected from the group consisting of 4-aminoazobenzene coupled with phenol, 4-dimethyl aminoazobenzene coupled with benzene, meta-nitro para-toluidene coupled with acetoacetanilide, 4-aminoazobenzene, and aniline coupled with phenol, the increased yellowness which develops in said component subject to yellowish heat discoloration being offset by a substantially equal loss of yellowness in said heat-fugitive yellow coloring matter when said composition is heated.

9. In the process of preparing a substantially white pigmented organic film-forming coating composition which contains a component subject to yellowish heat discoloration, the improvement which comprises incorporating in said composition a compatible heat-fugitive yellow coloring selected from the group consisting of 4-aminoazobenzene coupled with phenol, 4-dimethyl aminoazobenzene, meta-nitro para-toluidene coupled with acetacetoanilide, 4-aminoazobenzene, and aniline with phenol, the increased yellowness which coupled with phenol, the increased yellowness which develops in said component subject to yellowish heat discoloration being offset by a substantially equal loss of yellowness in said heat-fugitive yellow coloring matter when said composition is heated.

References Cited in the file of this patent
UNITED STATES PATENTS

| 1,560,346 | Fuller | Nov. 3, 1925 |
| 1,674,128 | Rose | June 19, 1928 |
| 2,102,789 | Dreyfus | Dec. 21, 1937 |
| 2,136,782 | Bucy | Nov. 15, 1938 |
| 2,190,825 | Corbiere | Feb. 20, 1940 |
| 2,559,787 | Opin | July 10, 1951 |